US012247410B2

(12) United States Patent
Su

(10) Patent No.: US 12,247,410 B2
(45) Date of Patent: Mar. 11, 2025

(54) PRYING TOOL WITH PRYING END WHICH HAS CHANGEABLE WIDTH

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 360 days.

(21) Appl. No.: 17/876,765

(22) Filed: Jul. 29, 2022

(65) Prior Publication Data

US 2022/0364379 A1 Nov. 17, 2022

Related U.S. Application Data

(63) Continuation-in-part of application No. 16/547,733, filed on Aug. 22, 2019, now Pat. No. 11,401,147.

(30) Foreign Application Priority Data

Nov. 7, 2018 (TW) ................................ 107139450

(51) Int. Cl.
*B66F 15/00* (2006.01)
*B25G 3/38* (2006.01)
*E04G 23/08* (2006.01)

(52) U.S. Cl.
CPC ............... *E04G 23/08* (2013.01); *B25G 3/38* (2013.01); *E04G 2023/085* (2013.01)

(58) Field of Classification Search
CPC ... B66F 15/00; E04G 23/08; E04G 2023/085; B25B 27/062; B25B 27/023; B25C 11/00; B25G 3/38
USPC ................................ 254/131, 129, 131.5, 25
See application file for complete search history.

(56) References Cited

U.S. PATENT DOCUMENTS

| | | | | |
|---|---|---|---|---|
| 1,375,751 A * | 4/1921 | Grannis | .................. B25B 27/00 254/129 |
| 2,052,304 A | 8/1936 | Kaplan | |
| 2,787,491 A | 4/1957 | Roberts | |
| 4,195,398 A | 4/1980 | Matthews | |
| 4,671,493 A | 6/1987 | Ravencroft | |
| 6,279,685 B1 | 8/2001 | Kogan et al. | |
| 7,322,087 B1 * | 1/2008 | Hu | ........................ B25B 27/023 29/261 |
| 8,177,191 B2 | 5/2012 | Liou | |

(Continued)

FOREIGN PATENT DOCUMENTS

| | | |
|---|---|---|
| CN | 102039577 B | 5/2013 |
| CN | 204772394 U | 11/2015 |

(Continued)

*Primary Examiner* — Mahdi H Nejad
(74) *Attorney, Agent, or Firm* — MUNCY, GEISSLER, OLDS & LOWE, P.C.

(57) ABSTRACT

A prying tool includes a prying end with a first prying member and a second prying member pivotally engaged with a main body of the prying tool. The first and the second prying members are pivotal toward and away from each other. The first prying member has a first claw and the second prying member has a second claw respectively. The first and the second prying members are pivotal between a first configuration in which first and the second claws are adjacent to each other and a second configuration in which the first and the second claws are away from each other.

12 Claims, 15 Drawing Sheets

(56) References Cited

U.S. PATENT DOCUMENTS

| | | | | |
|---|---|---|---|---|
| 8,201,806 | B2 | 6/2012 | Liou | |
| 8,215,617 | B2 | 7/2012 | Liou | |
| 8,256,577 | B2 | 9/2012 | Kritzer | |
| 8,297,596 | B2 | 10/2012 | Su | |
| 8,550,437 | B2 | 10/2013 | Liou | |
| 8,573,561 | B2 | 11/2013 | Su | |
| 9,139,214 | B2 | 9/2015 | Rich et al. | |
| 9,150,395 | B2 | 10/2015 | Kritzer | |
| 9,162,351 | B2 | 10/2015 | Liou | |
| 10,166,663 | B1 | 1/2019 | Christensen | |
| 10,618,787 | B2 | 4/2020 | Kasan | |
| D887,810 | S * | 6/2020 | Su | D8/89 |
| 10,793,410 | B2 | 10/2020 | Liou | |
| 11,820,632 | B2 * | 11/2023 | Kritzer | B66F 3/38 |
| 2009/0307848 | A1 | 12/2009 | Liou | |
| 2010/0108445 | A1 | 5/2010 | Kritzer | |
| 2010/0140575 | A1 * | 6/2010 | Liou | B66F 15/00 254/129 |
| 2010/0176356 | A1 | 7/2010 | Su | |
| 2010/0207081 | A1 * | 8/2010 | Liou | B25G 3/26 254/129 |
| 2012/0102699 | A1 * | 5/2012 | Bruce | B25B 27/02 254/130 |
| 2012/0145978 | A1 | 6/2012 | Rich et al. | |
| 2012/0175574 | A1 | 7/2012 | Liou | |
| 2012/0223279 | A1 | 9/2012 | Liou | |
| 2012/0261628 | A1 | 10/2012 | Su | |
| 2013/0233651 | A1 * | 9/2013 | Kritzer | B66F 3/46 187/208 |
| 2016/0023873 | A1 | 1/2016 | Kasan | |
| 2017/0066633 | A1 * | 3/2017 | Huber | B66D 1/26 |
| 2017/0144876 | A1 | 5/2017 | Kasan | |
| 2018/0127251 | A1 * | 5/2018 | Su | B66F 15/00 |
| 2020/0002145 | A1 * | 1/2020 | Liou | B66F 15/00 |
| 2020/0140250 | A1 * | 5/2020 | Su | E04G 23/08 |
| 2021/0114852 | A1 * | 4/2021 | Heath | B66F 7/28 |

FOREIGN PATENT DOCUMENTS

| | | | |
|---|---|---|---|
| CN | 205614582 | U * | 10/2016 |
| DE | 202008007740 | U1 | 8/2008 |
| TW | 201020074 | A | 6/2010 |
| TW | I336284 | B | 1/2011 |
| TW | I340685 | B | 4/2011 |
| TW | I371351 | B | 9/2012 |
| TW | I373447 | B | 10/2012 |
| TW | 107139450 | * | 11/2018 |

* cited by examiner

PRYING TOOL WITH PRYING END WHICH HAS CHANGEABLE WIDTH

CROSS REFERENCE

This application is a continuation-in-part of U.S. patent application Ser. No. 16/547,733, filed Aug. 22, 2019, the disclosures all of which are incorporated by reference in their entireties.

BACKGROUND OF THE INVENTION

1. Field of the Invention

The present invention relates to a prying tool and, particularly, to a prying tool with a prying end which has a changeable width.

2. Description of the Related Art

TW Pat. No. 1340685 shows a prying tool including a handle, two prying members, and two positioning devices. The handle includes a head portion and a grip portion. The first ends of the prying members are sleeved on the head portion and are movable on the head portion. The second ends of the prying members are configured to engage with an object to be pried. The positioning devices are configured to keep the prying members at various fixed positions with respect to the head portion and are disposed between the head portion and the prying members. The positioning devices are movable between a lock position and a release position. When the positioning devices are in the lock position, the prying members are restrained from moving relative to the handle portion. When the positioning devices are in the release position, the prying members are adapted to be moved relative to the head portion. When the plying members are adjacent to each other and cannot be moved closer, there is a gap opening delimited by the prying members when the prying members are adjacent to each other. The gap opening increases in width as the prying members move apart from each other. Therefore, a user can move the prying members closer for prying small objects and move them apart for prying large objects.

Since the prying tool has a wide head portion, it is impossible to use the prying tool in a restricted working space.

The present invention is, therefore, intended to obviate or at least to alleviate the problems encountered in the prior art.

SUMMARY OF THE INVENTION

The present invention discloses a prying tool with a prying end which has a changeable width has a main body, and the prying end including a first prying member and a second prying member pivotally engaged with the main body. The first and the second prying members are pivotal toward and away from each other. The prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other. The prying end increases its width when the first and the second prying members pivot from the first configuration to the third configuration. A locking mechanism is configured to selectively lock and unlock the first and the second prying members. The locking mechanism includes a position restrainer movably disposed on the main body and movable between a lock position and a release position. The position restrainer forms a restraining end selectively engaging with and disengaging from the first and the second prying members for selectively locking and preventing pivotal movement of the first and the second prying members with respect to the main body. The position restrainer is in the lock position when the prying end is in the first configuration and the third configuration and in the release position when the plying end is in the second configuration.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public to generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
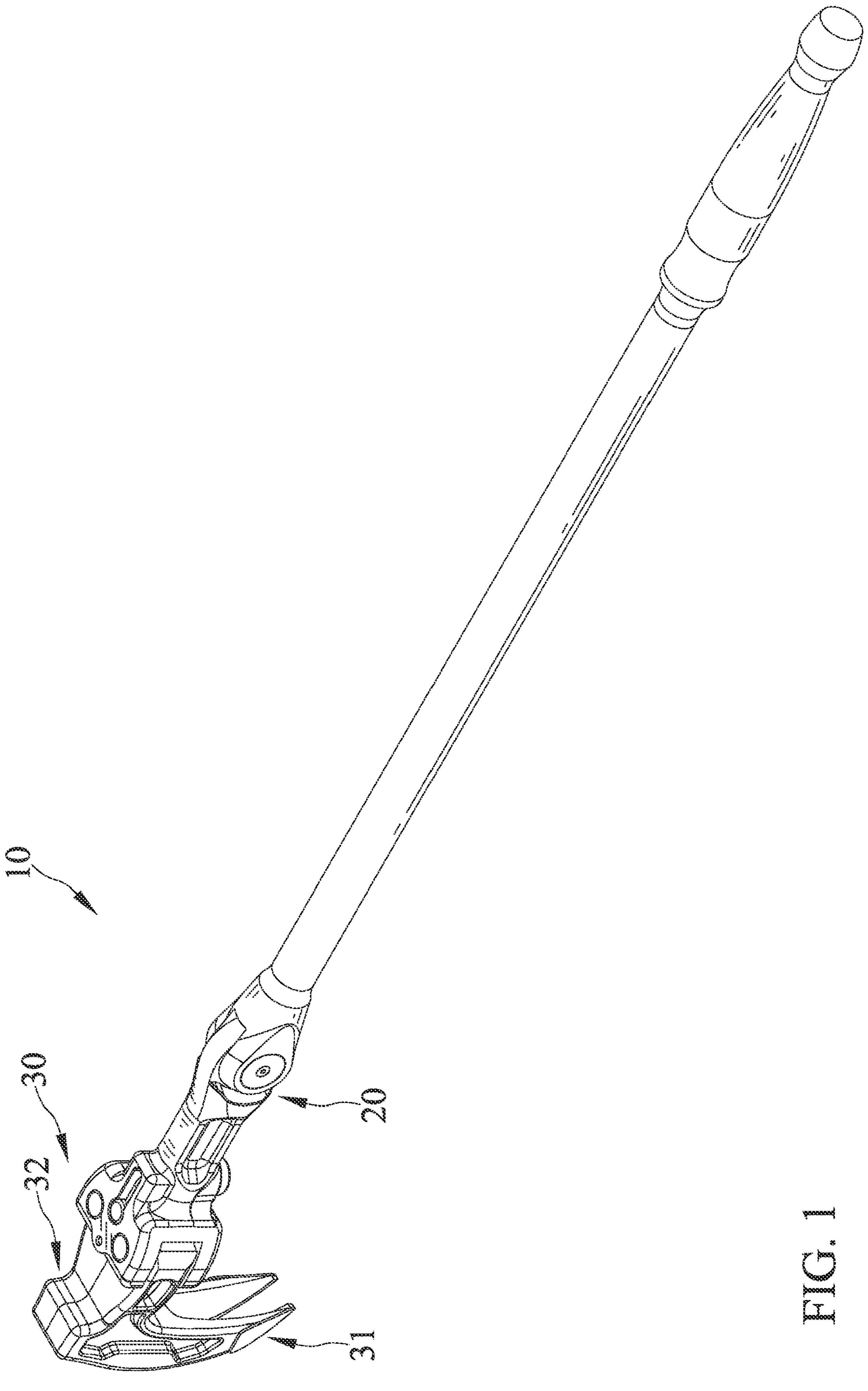
FIG. 1 is a perspective view of a prying tool in accordance with a first embodiment of the present invention and shows a prying end thereof in a first configuration.
Figure 2:
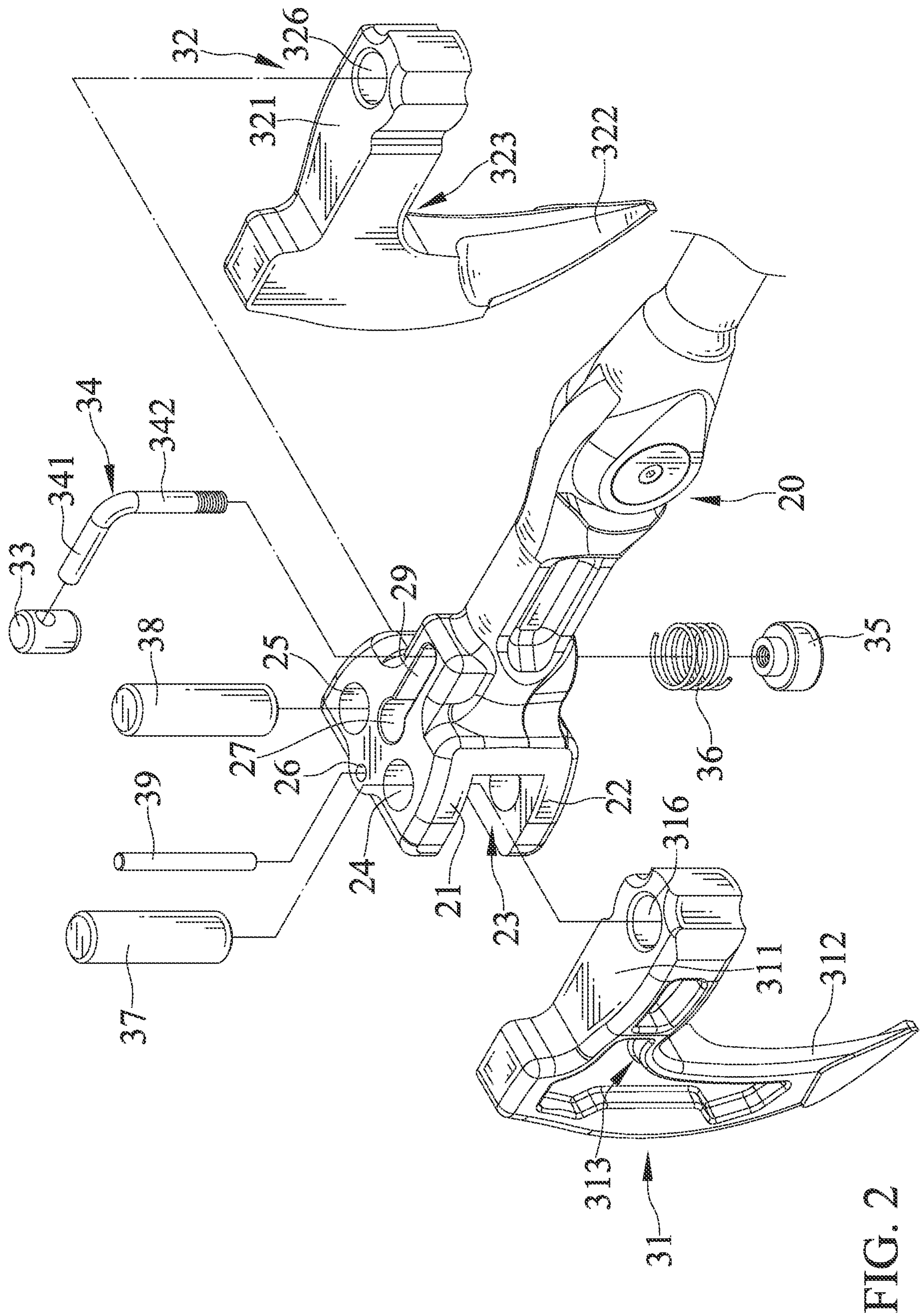
FIG. 2 is an exploded perspective view of the prying tool of FIG. 1.
Figure 3:
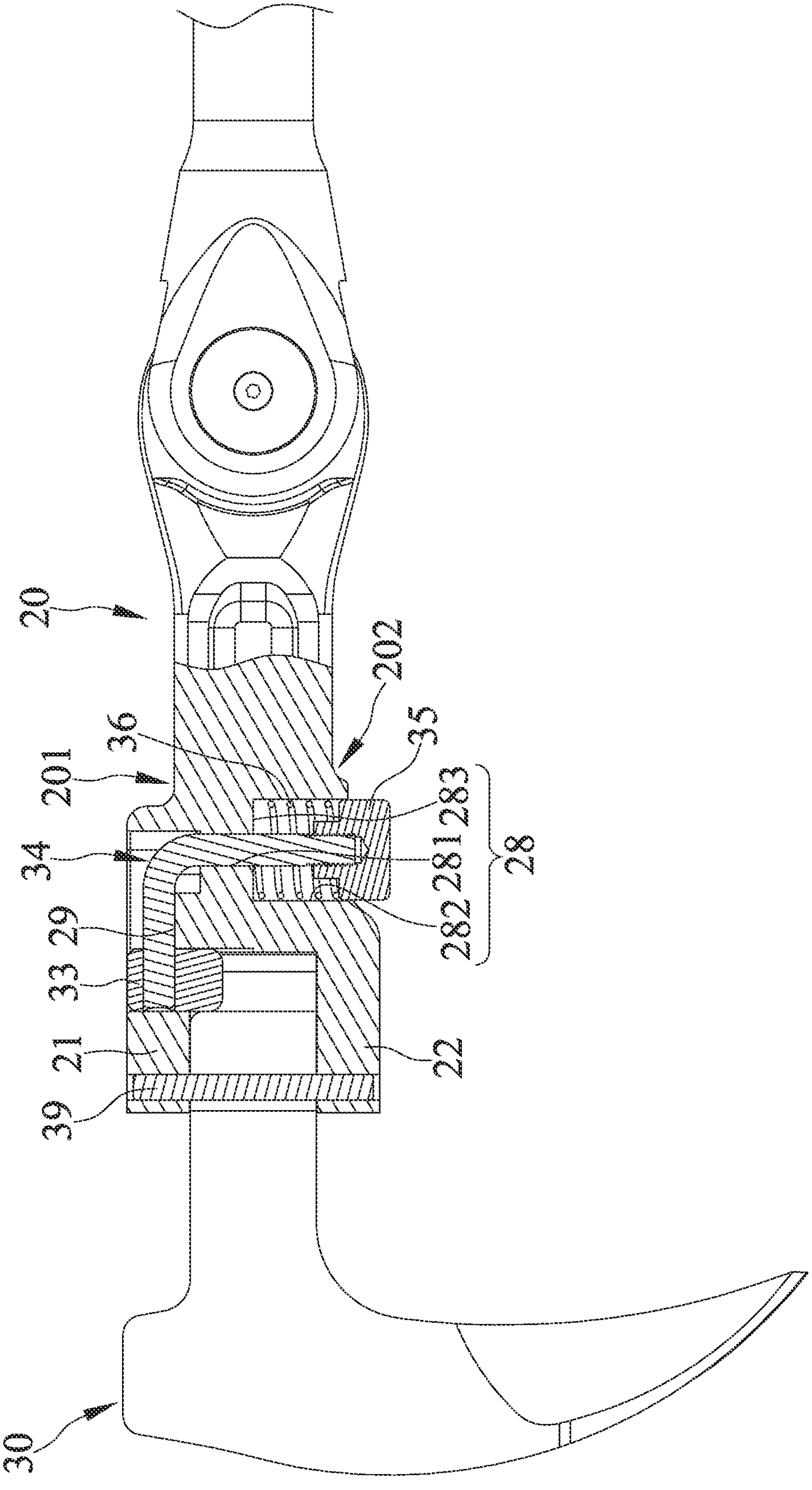
FIG. 3 is a partial, cross-sectional view of the prying tool of FIG. 1.
Figure 4:
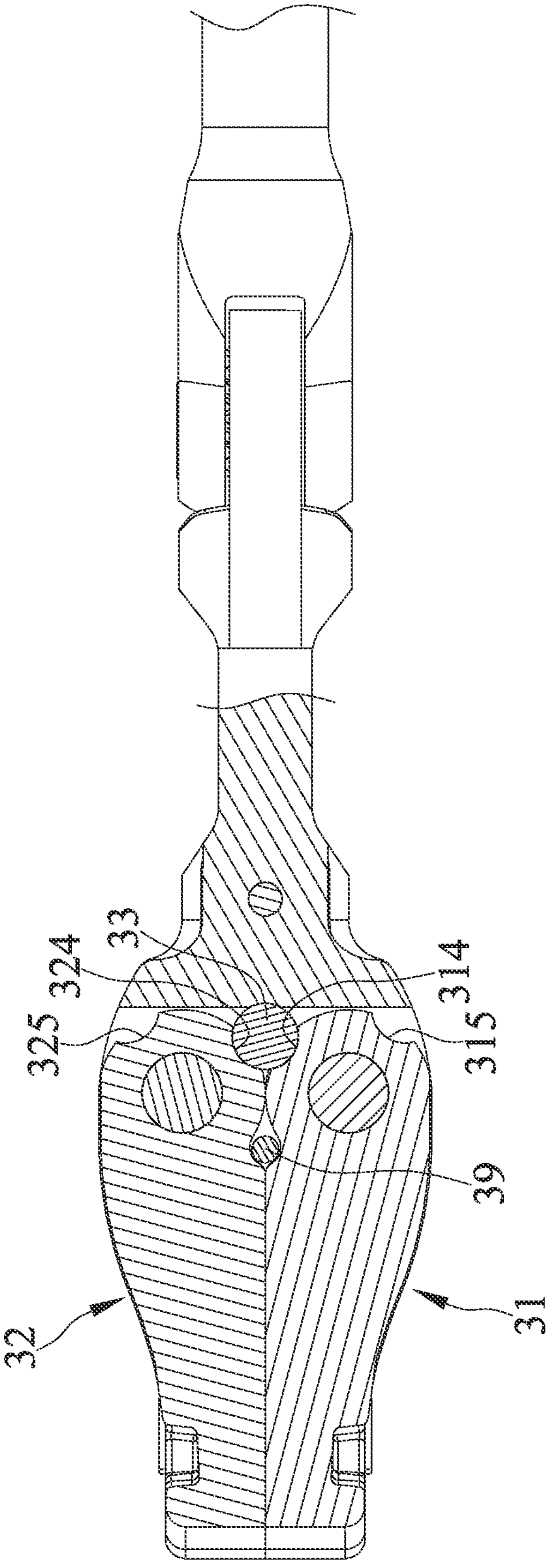
FIG. 4 is another partial, cross-sectional view of the plying tool of FIG. 1.
Figure 5:
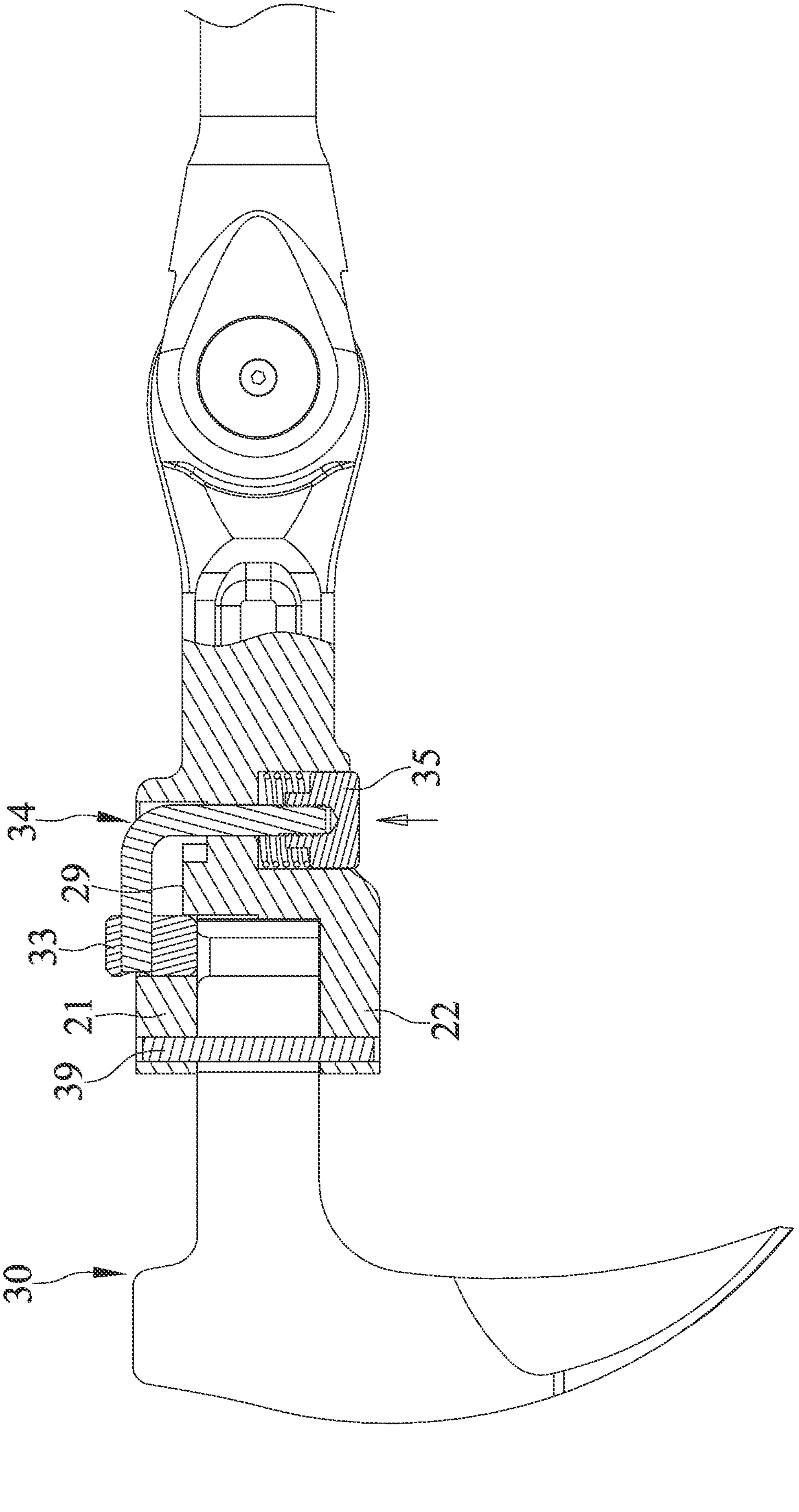
FIG. 5 is a cross-sectional view illustrating the operation of a position restrainer of the prying tool of FIG. 1 from a lock position shown in FIG. 3 to a release position.
Figure 6:
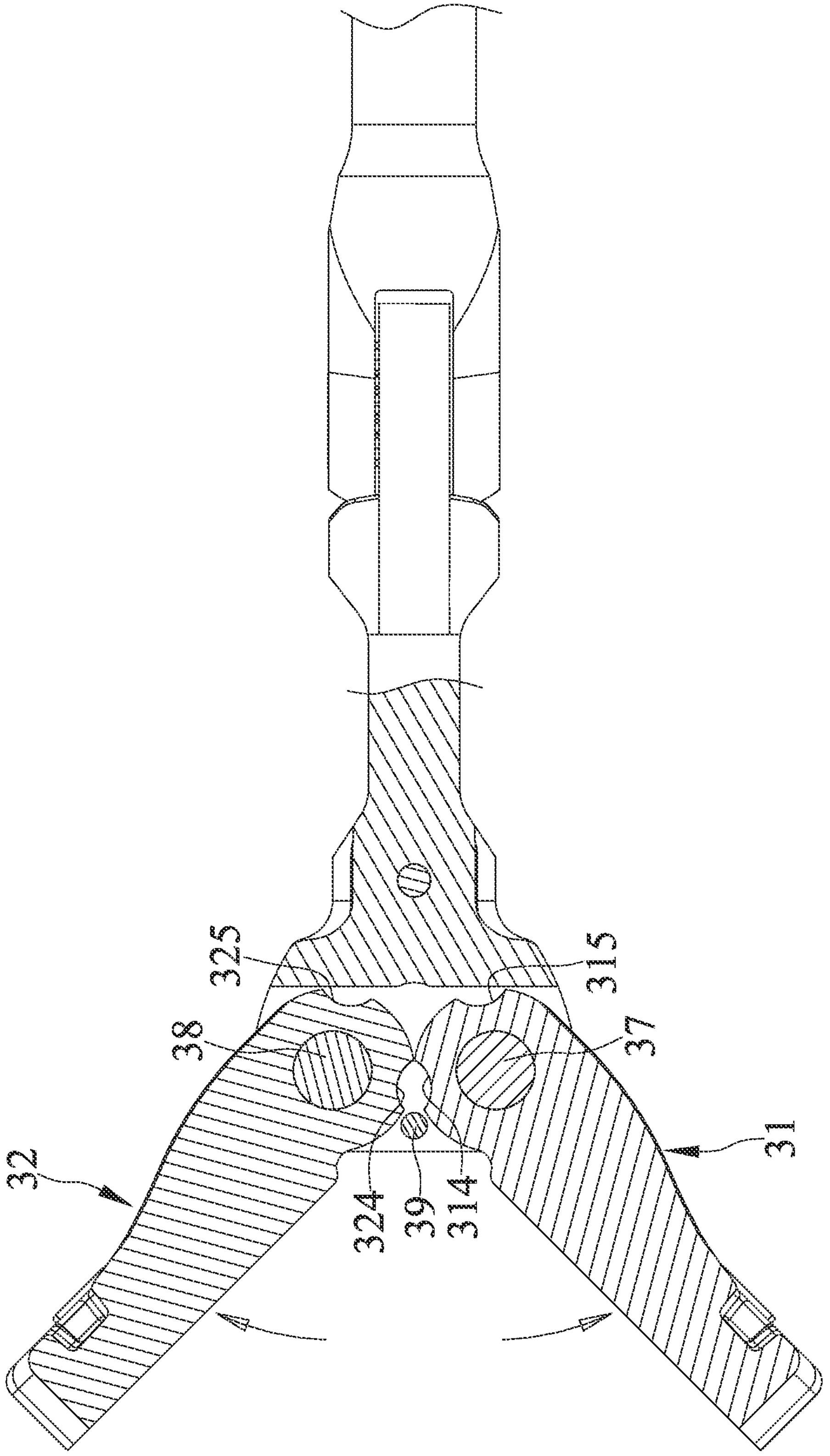
FIG. 6 is a cross-sectional view showing the prying end of the prying tool of FIG. 1 in a second configuration.
Figure 7:
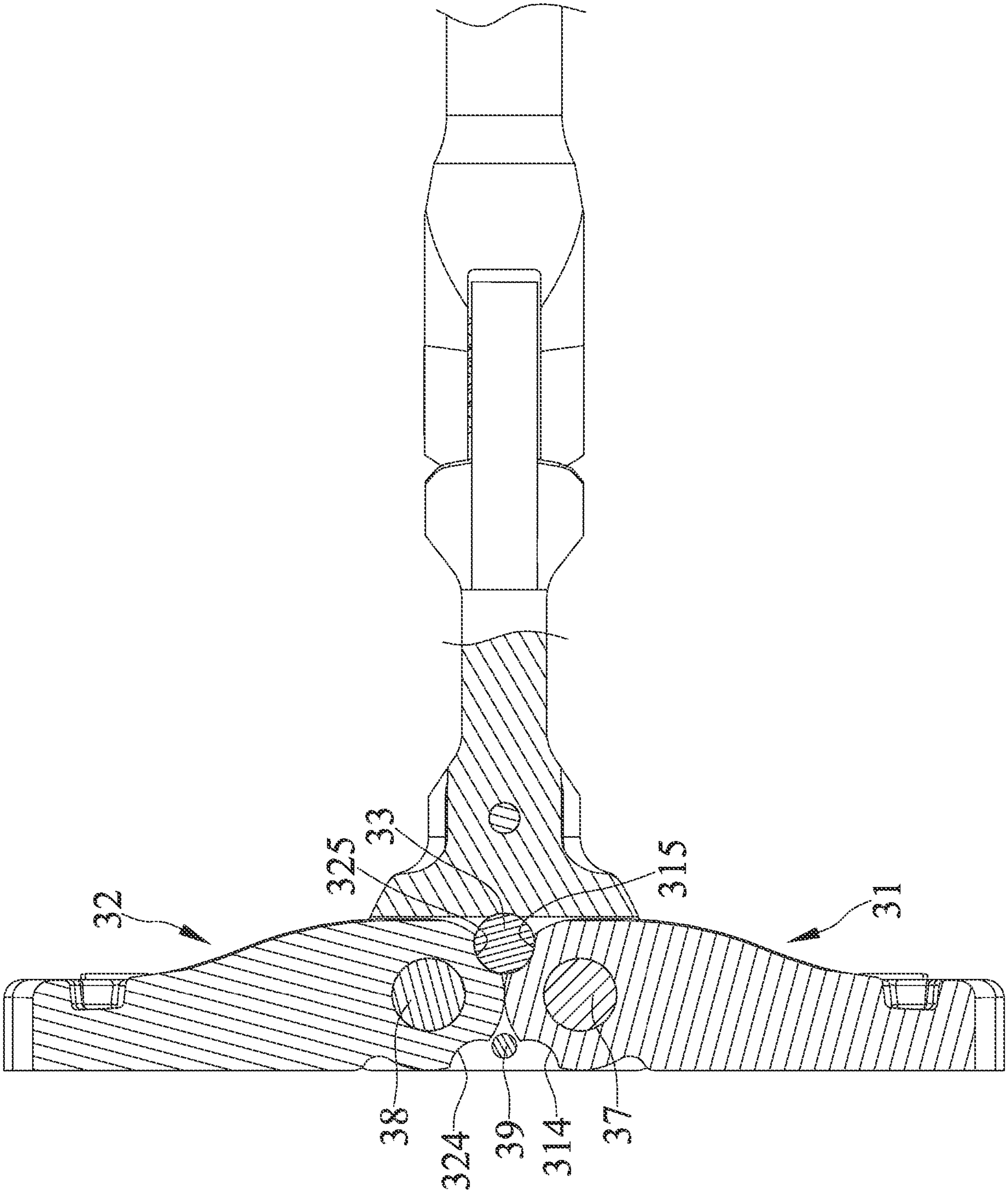
FIG. 7 is a cross-sectional view showing the plying end of the plying to tool of FIG. 1 in a third configuration.
Figure 8:
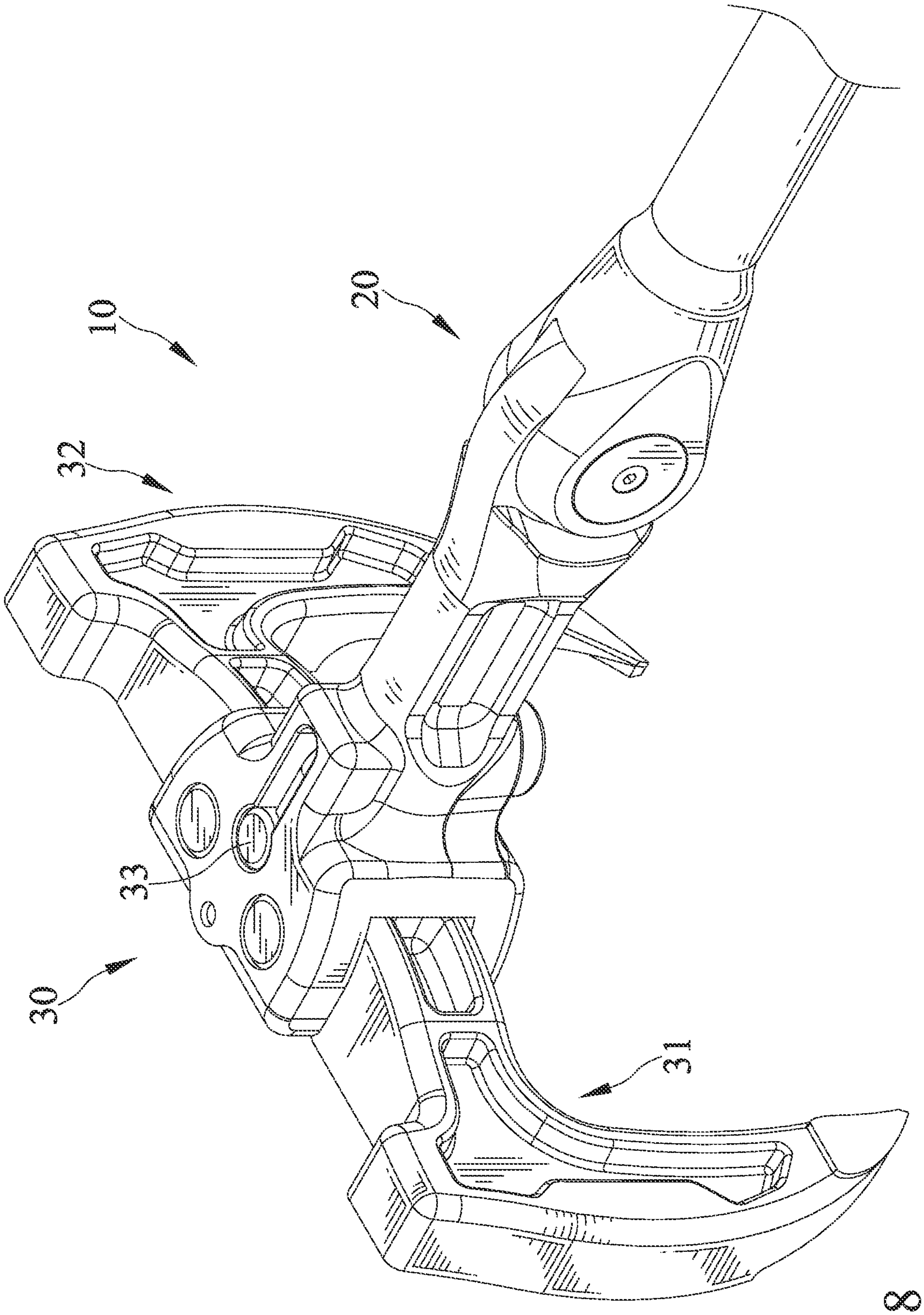
FIG. 8 is a perspective view showing the plying end of the prying tool of FIG. 1 in the third configuration.

FIGS. 1 through 8 show a prying tool 10 with a width changeable prying end according to the present invention.

The prying tool 10 has a prying end 30. The prying end 30 includes a prying member 31 and a plying member 32 pivotally engaged with a main body 20 of the prying tool 10. The prying members 31 and 32 are pivotal to toward and away from each other.

The prying members 31 and 32 respectively include an arm 311 and an arm 321 pivotally engaged with the main body 20. The main body 20 has a joining side 21 and a joining side 22 disposed separately and defines a slot 23 between the joining side 21 and the joining side 22. The slot 23 has an open end and a closed end and extends from the open end to the closed end along a length direction of the main body 20. The slot 23 also has two open sides and extends from one open side to another open side along a width direction of the main body 20. The main body 20 has a side 201 contiguous to the joining side 21 and a side 202 contiguous to the joining side 22. The sides 201 and 202 extend along the length direction of the main body 20. The arms 311 and 321 of the prying members 31 and 32 are pivotally engaged with the joining side 21 and the joining side 22 and inserted into the slot 23. The joining side 21 and the arm 311 respectively define pivot holes 24 and 316. The pivot holes 24 and 316 include a pivot 37 engaged therein, whereby the prying member 31 is pivotal about the pivot 37. The joining side 21 and the arm 321 respectively define pivot holes 25 and 326. The pivot holes 25 and 326 include a pivot 38 engaged therein, whereby the prying member 32 is pivotal about the pivot 38.

The plying member 31 has a claw 312 and the prying member 32 has a claw 322 respectively. The claws 312 and 322 are usable for prying an object and each has a prying surface for supporting and lifting the object to be pried. The claw 312 extends from the arm 311 and the claw 322 extends from the arm 321 respectively. The claw 312 extends radially from the arm 311 and the prying member 31 has a curved portion 313 extending from the arm 11 to the claw 312. The claw 322 extends radially from the arm 321 and the prying member 32 has a curved portion 323 extending from the arm 321 to the claw 322.

The prying end 30 has a first configuration in which the prying members 31 and 32 are locked and disposed adjacent to each other and include inner lateral sides thereof facing each other, a second configuration in which the plying members 31 and 32 are unlocked and adapted to be moved away from each other, and a third configuration in which the prying members 31 and 32 are locked and disposed away from each other and include the inner lateral sides thereof not facing each other, and particularly aligned with each other. The arm 311 and the arm 321 are adjacent to each other when the claws 312 and 322 are adjacent to each other. The claw 312 abuts against the claw 322 when the claws 312 and 322 are adjacent to each other. The arm 311 abuts against the second arm 321 when the arm 311 and the arm 321 are adjacent to each other. The prying end 30 increases its width when the prying members 31 and 32 pivot from the first configuration to the third configuration. The prying end 30 decreases its width when the prying members 31 and 32 pivot from the third configuration to the first configuration.

The prying tool 10 includes a locking mechanism configured to selectively lock and unlock the prying members 31 and 32. The locking mechanism includes a position restrainer 33 movably disposed on the main body 20 and adapted to engage with and disengage from the prying members 31 and 32 for selectively locking and preventing pivotal movement of the prying members 31 and 32 with respect to the main body 20. The position restrainer 33 is movable between a lock position and a release position. The prying members 31 and 32 are prevented from pivoting with respect to the main body 20 when the position restrainer 33 is in the lock position. The prying members 31 and 32 are allowed to pivot when the position restrainer 33 is in the release position.

Each of the prying members 31 and 32 has a plurality of engaging portions 314, 315, 324, and 325 with which the position restrainer 33 is adapted to engage. The engaging portions 314 and 324 are adjacent to the inner lateral sides of the prying members 31 and 32. The engaging portions 315 and 325 are adjacent to outer lateral sides of the prying members 31 and 32. The plurality of engaging portions 314 and 315 of the prying member 31 are disposed circumferentially on the arm 311. The plurality of engaging portions 324 and 325 of the prying member 32 are disposed circumferentially the arm 321. Each of the plurality of engaging portions 314 of the prying member 31 and the plurality of engaging portions 324 of the prying member 32 is in a form of a recess.

The position restrainer 33 is configured to selectively lock and unlock the prying members 31 and 32. When the prying members 31 and 32 are in the first configuration, the position restrainer 33 is in the locked position and engaged with one of the plurality of engaging portions 314 of the prying member 31 and one of the plurality of engaging portions 324 of the prying member 32. When the prying members 31 and 32 are in the third configuration, the position restrainer 33 is locked and engaged with another of the plurality of engaging portions 315 of the prying member 31 and another of the plurality of engaging portions 325 of the prying member 32. As set forth, the position restrainer 33 is movable to the release position. When the prying members 31 and 32 are unlocked, the position restrainer 33 is not in contact with the any of the plurality of engaging portions 314, 315, 324, and 325 of the prying members 31 and 32, and the prying members 31 and 32 are movable from the first to the third configurations or vice versa and to the second configuration.

The position restrainer 33 is adapted to move in and out of a hole 27 of the main body 20. The position restrainer 33 is moved in the hole 27 when in the locking position and is moved out the hole 27 when in the release position. The hole 27 is connected to the slot 23.

The position restrainer 33 is adapted to be operably moved between the lock position and the release position by a controller 35. The position restrainer 33 and the controller 35 are connected together by a link 34. The link 34 is L-shaped. The link 34 includes an end 341 connected to position restrainer 33 and an end 342 connected to the controller 35. The link 34 extends into a hole 29 and a cavity 28 of the main body 20 when the position restrainer 33 is in the locking position. The hole 29 extends between the hole 27 and the cavity 28. The hole 29 is connected to the hole 27. The cavity 28 is connected to the hole 29. The cavity 28 has a section 281 and a section 282 with the section 281 having a smaller diametrical size than the section 282. The controller 35 is urged by a resilient member 36. The controller 35 and the resilient member 36 are disposed in the section 282 of the cavity 28. The resilient member 36 has an end against a wall 283 extending from the section 281 of the cavity 28 to the section 282 of the cavity 28 and an end against the controller 35.

Further, a position limiter 39 is disposed between the prying members 31 and 32. The position limiter 39 has an end connected to the joining side 21 and another end connected to the joining side 22. The orifice 26 extends into the joining sides 21 and 22 and the position limiter 39 is inserted in the orifice 26.

Figure 9:
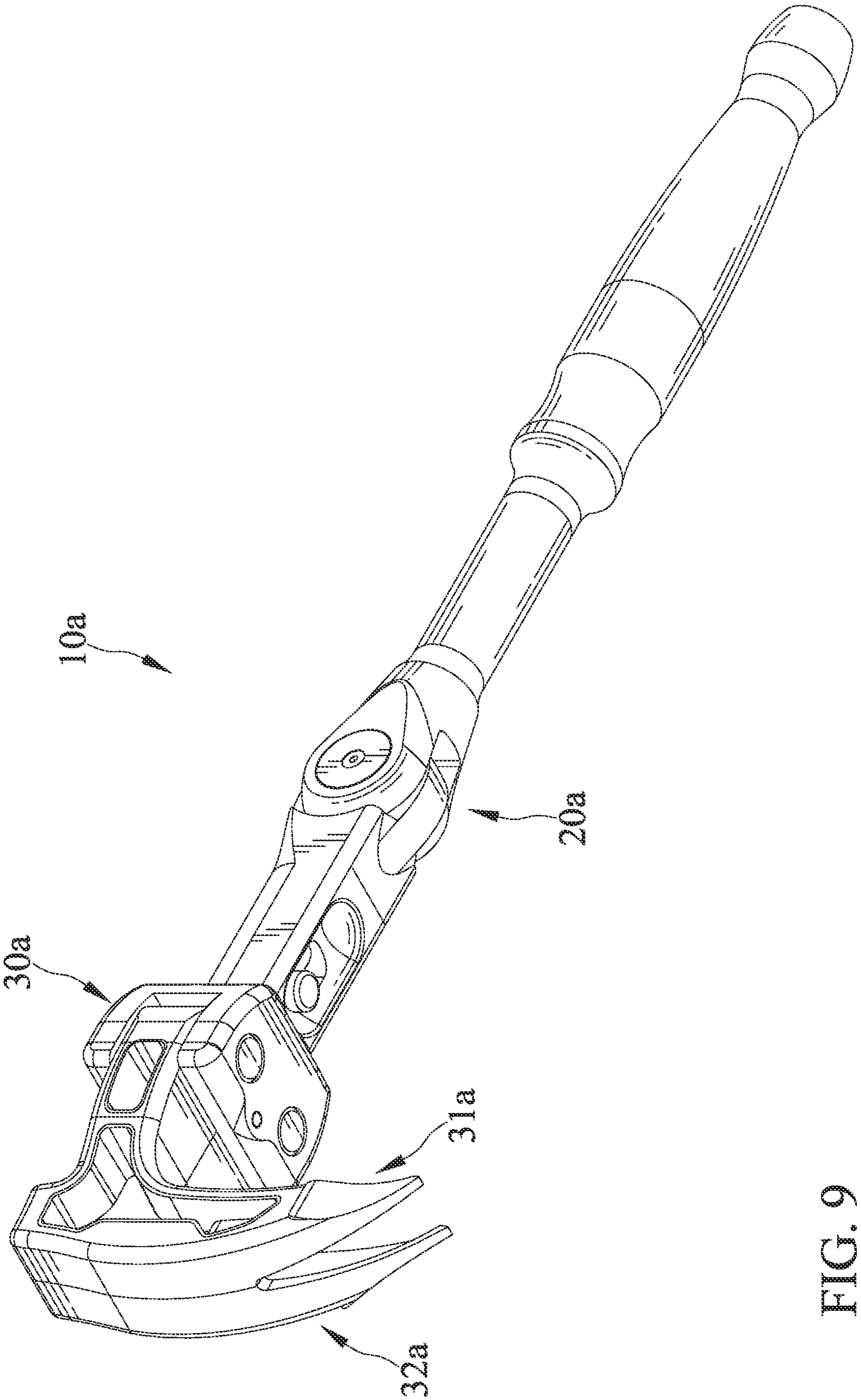
FIG. 9 is a perspective view of a plying tool in accordance with a second embodiment of the present invention and shows a plying end thereof in a first configuration.
Figure 10:
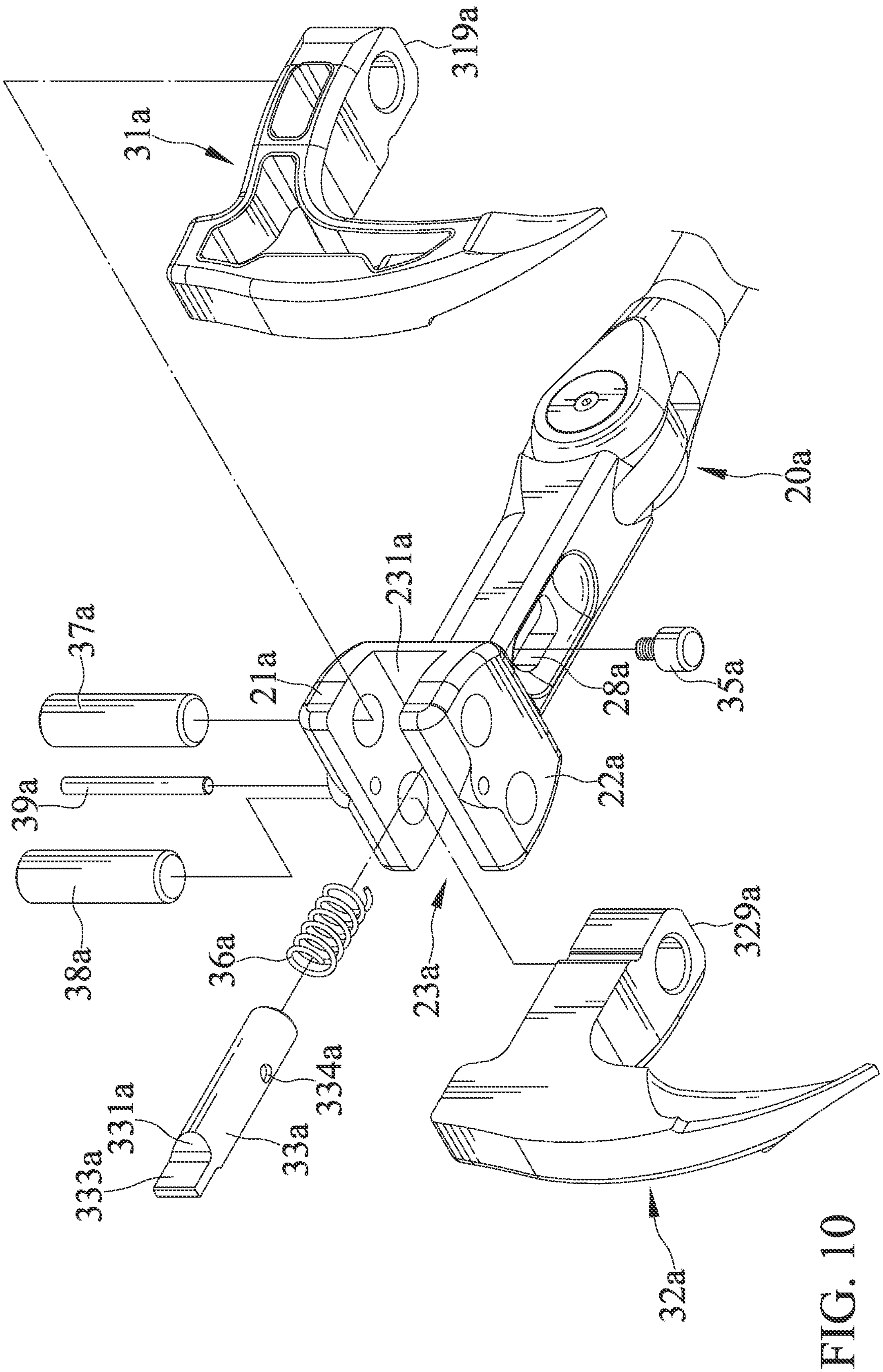
FIG. 10 is an exploded perspective view of the prying tool of FIG. 9.
Figure 11:
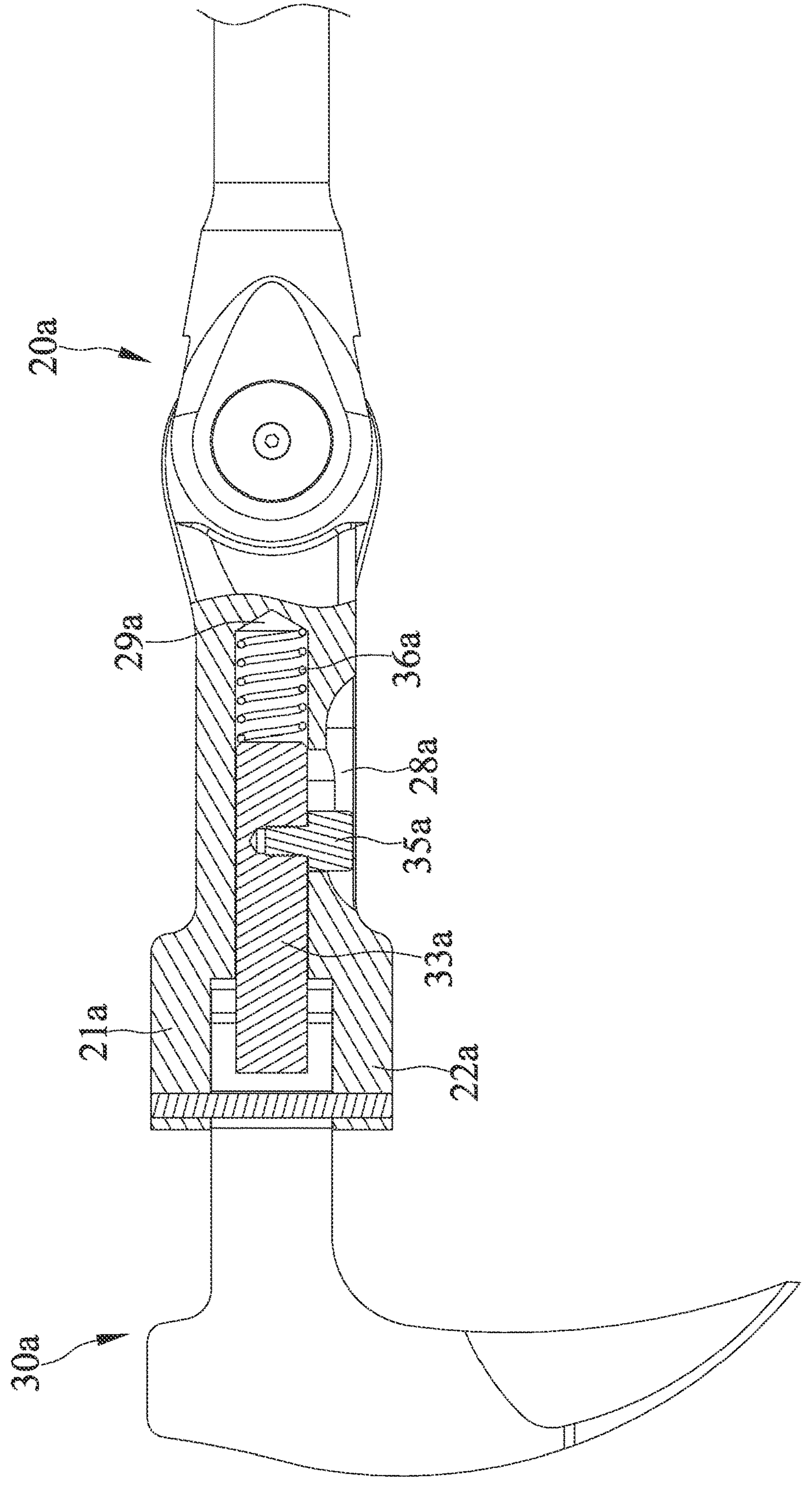
FIG. 11 is a partial, cross-sectional view of the prying tool of FIG. 9.
Figure 12:
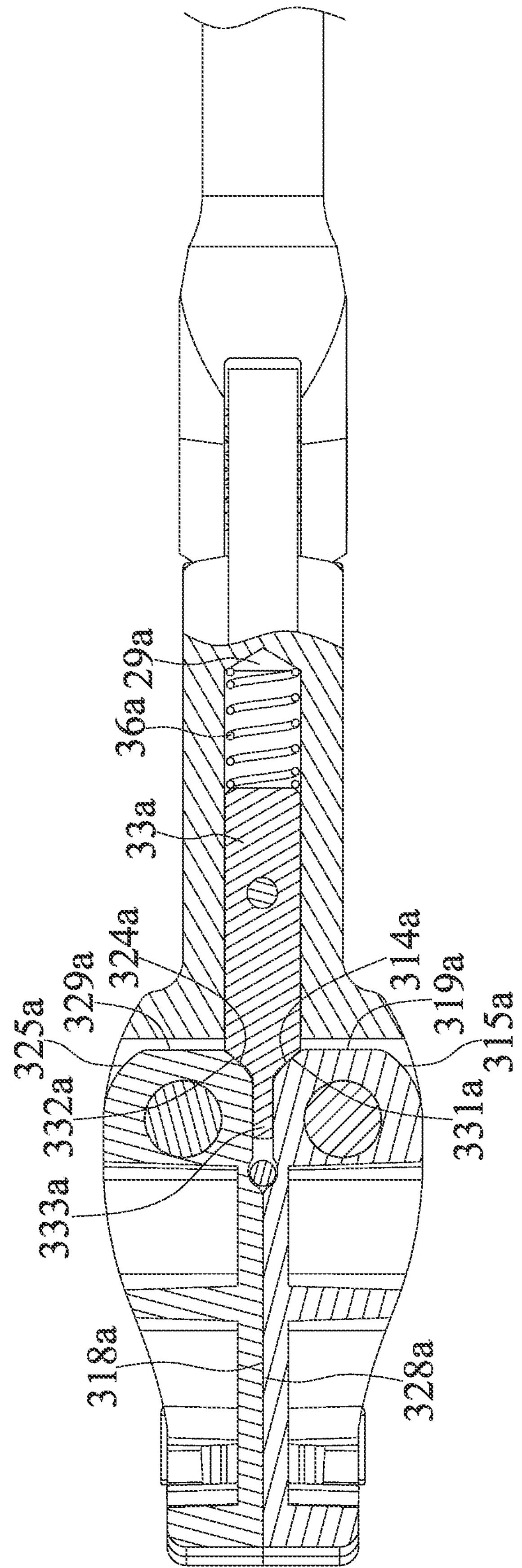
FIG. 12 is another partial, cross-sectional view of the prying tool of FIG. 9.
Figure 13:
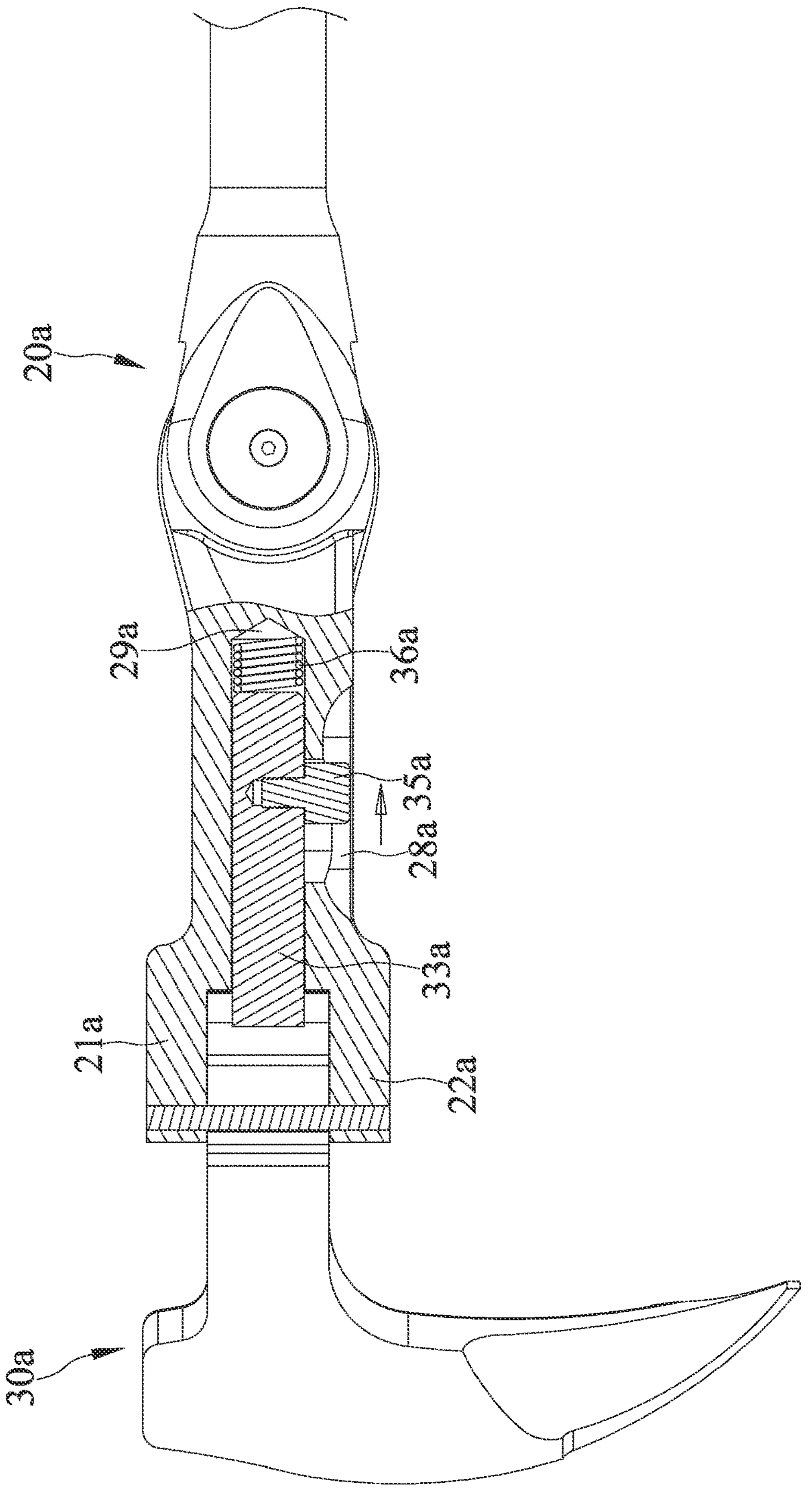
FIG. 13 is a cross-sectional view illustrating the operation of a position restrainer of the plying tool of FIG. 9 from a lock position to a release position.
Figure 14:
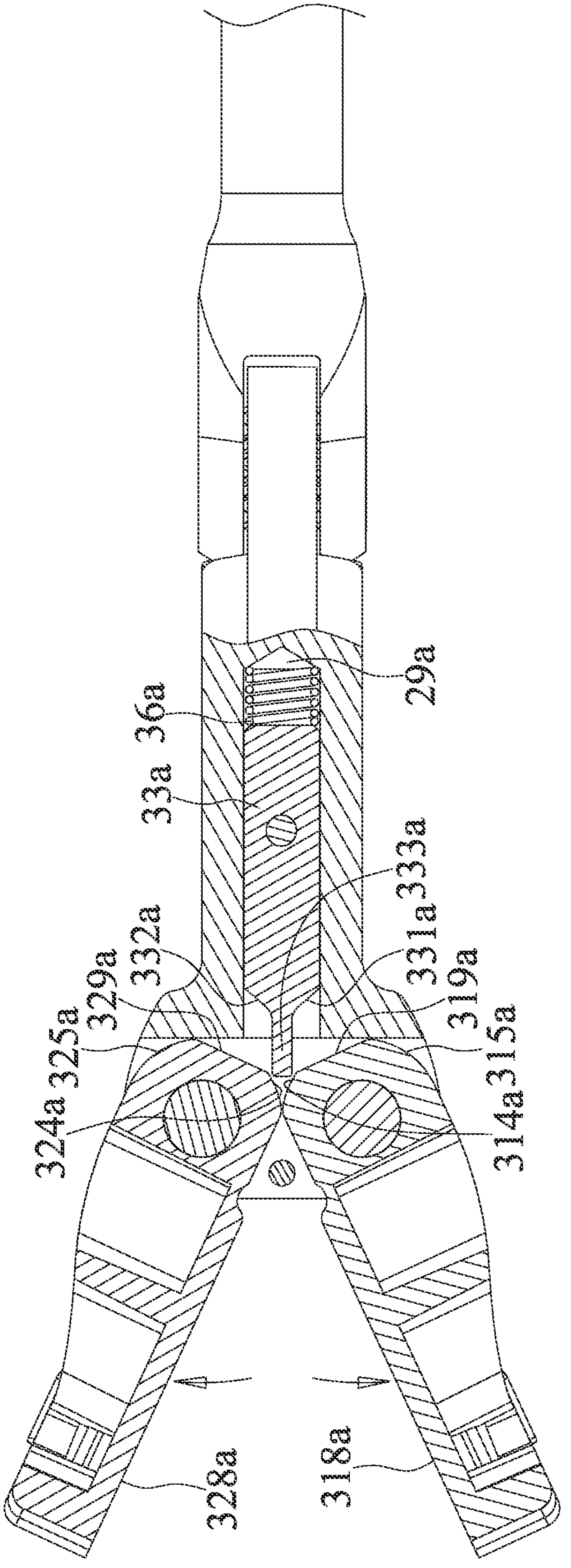
FIG. 14 is a cross-sectional view showing the plying end of the plying tool of FIG. 9 in a second configuration.
Figure 15:
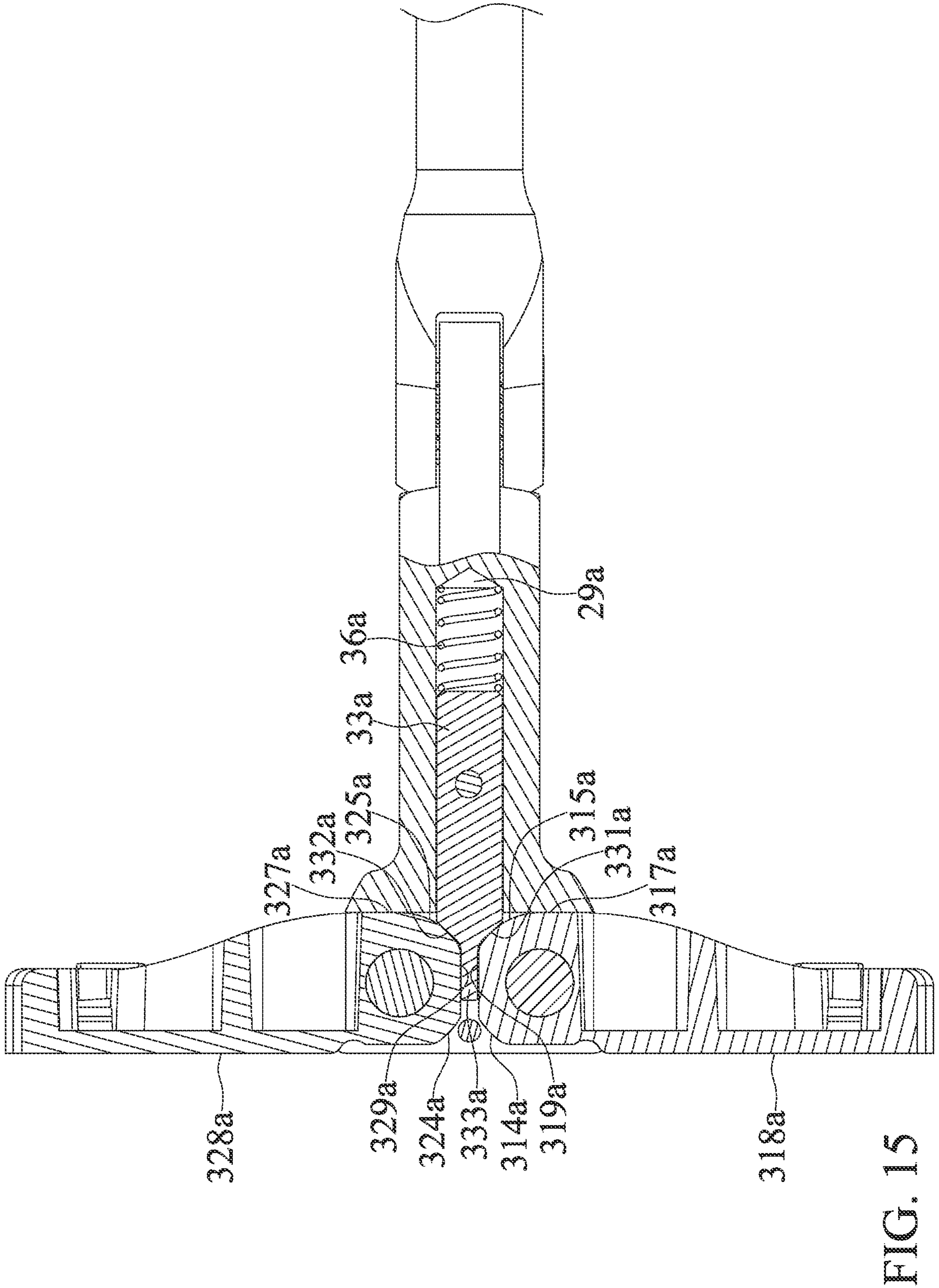
FIG. 15 is a cross-sectional view showing the prying end of the prying tool of FIG. 9 in a third configuration.

FIGS. 9 through 15 show a prying tool 10*a* with a width changeable prying end according to a second embodiment of the present invention, and the same numbers are used to correlate similar components of the first embodiment, but bearing a letter a. Further, descriptions of certain similarities may be omitted herein for the sake of brevity.

The prying tool 10*a*, includes a main body 20*a* and a prying end 30*a*. The prying end 30*a* includes a prying member 31*a* and a prying member 32*a* pivotally engaged with the main body 20*a*. The prying members 31*a* and 32*a* are pivotal toward and away from each other.

The main body 20*a* has a joining side 21*a* and a joining side 22*a* disposed separately and has a slot 23*a* delimited therebetween. The slot 23*a* has an open end and a closed end and extends from the open end to the closed end along a length direction of the main body 20*a*. The slot 23*a* also has two open sides and extends from one open side to another open side along a width direction of the main body 20*a*. The prying members 31*a* and 32*a* are pivotally engaged with the joining side 21*a* and the joining side 22*a* and inserted into the slot 23*a*. The prying member 31*a* has an end forming a pivot end and is pivotal about a pivot 37*a*. The prying member 32*a* has an end forming a pivot end and is pivotal about a pivot 38*a*. The pivots 37*a* and 38*a* each has an end connected to the joining side 21*a* and another end connected to the joining side 22*a*. Additionally, the prying members 31*a* and 32*a* include a position limiter 39*a* disposed therebetween. The position limiter 39*a* has an end connected to the joining side 21*a* and another end connected to the joining side 22*a*.

The prying end 30*a*, has a first configuration in which the prying members 31*a* and 32*a* are locked and disposed adjacent to each other and include inner lateral sides 318*a* and 328*a* thereof facing each other, a second configuration in which the prying members 31*a* and 32*a* are unlocked and adapted to be moved away from each other, and a third configuration in which the prying members 31*a* and 32*a* are locked and disposed away from each other and include the inner lateral sides 318*a* and 328*a* thereof not facing each other, and particularly aligned with each other. The prying end 30*a* increases its width when the prying members 31*a* and 32*a* pivot from the first configuration to the third configuration. The prying end 30*a* decreases its width when the prying members 31*a* and 32*a* pivot from the third configuration to the first configuration. Further, each of the inner lateral sides 318*a* and 328*a* of the prying members 31*a* and 32*a* has a recessed surface, and the recessed surface of the prying member 31*a* abuts one of two to opposite sides of the position limiter 39*a* and the recessed surface of the prying member 32*a* abuts another of the two Opposite sides of the position limiter 39*a* when the prying end 30*a* is in the first configuration.

The prying tool 10*a* includes a locking mechanism configured to selectively lock and unlock the prying members 31*a* and 32*a*. The locking mechanism is disengaged from prying members 31*a* and 32*a*, when the prying end 30*a* is in the second configuration. The locking mechanism includes a position restrainer 33*a* adapted to engage with and disengage from the prying members 31*a* and 32*a* for selectively locking and preventing pivotal movement of the prying members 31*a* and 32*a* with respect to the main body 20*a*. The position restrainer 33*a* is movable between a lock position and a release position. The prying members 31*a* and 32*a* are prevented from pivoting with respect to the main body 20*a* when the position restrainer 33*a* is in the lock position. The prying members 31*a* and 32*a* are allowed to pivot when the position restrainer 33*a* is in the release position.

However, the locking mechanism of the prying tool 10*a* is different from that of the prying tool 10. The locking mechanism includes a position restrainer 33*a* movably disposed on the main body 20*a*. The main body 20*a* has a hole 29*a* and the position restrainer 33*a* is movably disposed and moves linearly in the hole 29*a*. The hole 29*a* extends along the length direction of the main body 20*a* from the slot 23*a*. The hole 29*a* has an open end opening to the slot 23*a* and a closed end opposite the open end and extends from the open end to the closed end along the length direction of the main body 20*a*. The position restrainer 33*a* is biased by a resilient member 36*a*. The to resilient member 36*a* has one of two opposite ends abutting the closed end of the hole 29*a* and another of the two opposite ends abutting the position restrainer 33*a*. The position restrainer 33*a* has an end disposed outside the hole 29*a* and protruding in the slot 23*a*, and the end forms a restraining end configured to selectively engage with the prying members 31*a* and 32*a* to restrain the prying members 31*a* and 32*a* when the prying end 30*a* is in the first and the third configurations.

The prying members 31*a* has a plurality of engaging portions 314*a* and 315*a* with which the position restrainer 33*a*, i.e. a restraining portion 331*a* of the restraining end, is adapted to selectively engage, i.e. the restraining portion 331*a* abuts the engaging portion 314*a* when the prying end 30*a* is in the first configuration and abuts the engaging portion 315*a* when the prying end 30*a* is in the third configuration. The prying member 32*a* has a plurality of engaging portions 324*a* and 325*a* with which the position restrainer 33*a*, i.e. a restraining portion 332*a* of the restraining end, is adapted to selectively engage, i.e. the restraining portion 332*a* abuts the engaging portion 324*a* when the prying end 30*a* is in the first configuration and abuts the engaging portion 325*a* when the prying end 30*a* is in the third configuration. The engaging portions 314*a* and 324*a* are adjacent to the inner lateral sides 318*a* and 328*a* of the prying members 31*a* and 32*a*. The engaging portions 315*a* and 325*a* are adjacent to outer lateral sides 317*a* and 327*a* of the prying members 31_a_ and 32_a_. The restraining portion 331_a_ is in a form of a curved surface and each of the plurality of engaging portions 314_a_ and 315_a_ of the prying members 31_a_ is in a form of a surface corresponding to the surface of to restraining portion 331_a_. The restraining portion 332_a_ is in a form of a curved surface and each of the plurality of engaging portions 324_a_ and 325_a_ of the prying member 32_a_ is in a form of a surface corresponding to the surface of restraining portion 332_a_. The restraining end further has a restraining portion 333_a_ adapted to lock the prying members 31_a_ and 32_a_. The restraining portion 333_a_ is slender. The restraining portion 331_a_ has an end adjacent to one of two opposite sides of the restraining portion 333_a_ and the restraining portion 332_a_ has an end adjacent to another of two opposite sides of the restraining portion 333_a_ respectively. The restraining end has an increasing width as it extends along a length direction thereof from the restraining portion 333_a_ to the restraining portions 331_a_ and 332_a_. The restraining portion 333_a_ is inserted into a space between the prying members 31_a_ and 32_a_ and has one of two opposite sides abutting the inner lateral side 318_a_ and another of the two opposite sides abutting the inner lateral side 328_a_ when the prying end 30_a_ is in the first configuration. The restraining portion 333_a_ is inserted into the space between the prying members 31_a_ and 32_a_ and includes one of the two opposite sides abutting an end side 319_a_ of the prying member 31_a_ and another of the two opposite sides abutting an end side 329_a_ of the prying member 32_a_ when the prying end 30_a_ is in the third configuration.

Additionally, when the prying end 30_a_ is in the first configuration, the end sides 319_a_ and 329_a_ do not abut an end surface 231_a_, of the closed end of the slot 23_a_. When the prying end 30_a_ is in the third configuration, the outer lateral sides 317_a_ and 327_a_ of the prying members 31_a_ and 32_a_ abut the end to surface 231_a_ of the closed end of the slot 23_a_.

Further, the position restrainer 33_a_, is adapted to be operably moved between the lock position and the release position by a controller 35_a_. The controller 35_a_ is coupled to the position restrainer 33_a_. The position restrainer 33 has an aperture 334_a_ to which an end of the controller 35_a_ is connected. The controller 35 has another end is disposed outside the hole 29_a_, thereby allowing a user to input to control movement of the position restrainer 33_a_. The controller 35_a_ extends in a cavity 28_a_ which extends from the hole 29_a_ to an outer periphery of the main body 20_a_.

In view of the foregoing, the plying members 31, 31_a_, 32, and 32_a_ are pivotal toward and away from each other. The prying ends 30 and 30_a_ increases its width when the prying members 31, 31_a_, 32, and 32_a_ pivot from the first configuration to the third configuration. Conversely, the prying end 30 and 30_a_ decreases its width when the prying members 31, 31_a_, 32, and 32_a_ pivot from the second configuration to the first configuration.

The foregoing is merely illustrative of the principles of this invention, and various modifications can be made by those skilled in the art without departing from the scope and spirit of the invention.

What is claimed is:

1. A prying tool with a prying end which has a changeable width, comprising:

a main body; the prying end including a first prying member and a second prying member pivotally engaged with the main body, wherein the first and the second prying members are pivotal toward and away from each other, wherein the prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other, and wherein the prying end increases its width when the first and the second prying members pivot from the first configuration to the third configuration; and a locking mechanism configured to selectively lock and unlock the first and the second prying members, wherein the locking mechanism includes a position restrainer movably disposed on the main body and movable between a lock position and a release position, wherein the position restrainer forms a restraining end selectively engaging with and disengaging from the first and the second prying members for selectively locking and preventing pivotal movement of the first and the second prying members with respect to the main body, and wherein the position restrainer is in the lock position when the prying end is in the first configuration and the third configuration and in the release position when the prying end is in the second configuration;

wherein the first prying member has a plurality of first engaging portions with which the position restrainer is adapted to selectively engage, wherein the position restrainer abuts one of the plurality of the first engaging portions when the prying end is in the first configuration and abuts another of the plurality of the first engaging portions when the prying end is in the third configuration, wherein the second prying member has a plurality of second engaging portions with which the position restrainer is adapted to selectively engage, wherein the position restrainer abuts one of the plurality of the second engaging portions when the prying end is in the first configuration and abuts another of the plurality of the second engaging portions when the prying end is in the third configuration, wherein one of the plurality of the first engaging portions and one of the plurality of the second engaging portions are adjacent to the inner lateral sides of the first and the second prying members, and wherein another of the plurality of the first engaging portions and another of the plurality of the second engaging portions are adjacent to outer lateral sides of the first and the second prying members.

2. The prying tool as claimed in claim 1, wherein the restraining end has a first restraining portion selectively abutting the plurality of the first engaging portions of the first prying member, and wherein the restraining end has a second restraining portion selectively abutting the plurality of the second engaging portions of the second prying member.

3. The prying tool as claimed in claim 2, wherein the first restraining portion is in a form of a curved surface and each of the plurality of the first engaging portions of the first prying member is in a form of a surface corresponding to the surface of first restraining portion, and wherein the second restraining portion is in a form of a curved surface and each of the plurality of the second engaging portions of the second prying member is in a form of a surface corresponding to the surface of second restraining portion.

4. The prying tool as claimed in claim 2, wherein the restraining end further has a third restraining portion adapted to lock the first and the second prying members, wherein the first restraining portion has an end adjacent to one of two opposite sides of the third restraining portion and the second restraining portion has an end adjacent to another of two opposite sides of the third restraining portion respectively, wherein the restraining end has an increasing width as it extends along a length direction thereof from the third restraining portion to the first and the second restraining portions, wherein the third restraining portion is inserted into a space between the first and the second prying members and has one of two opposite sides abutting the inner lateral side of the first prying member and another of the two opposite sides abutting the inner lateral side of the second prying member when the prying end is in the first configuration, and wherein the third restraining portion is inserted into the space between the first and the second prying members and includes one of the two opposite sides abutting an end side of the first prying member and another of the two opposite sides abutting an end side of the second prying member when the prying end is in the third configuration.

5. The prying tool as claimed in claim 4, wherein the main body has a first joining side and a second joining side disposed separately and has a slot delimited therebetween, wherein the slot has an open end and a closed end and extends from the open end to the closed end along a length direction of the main body, wherein the slot also has two open sides and extends from one open side to another open side along a width direction of the main body, wherein when the prying end is in the first configuration, the end sides of the first and the second prying members do not abut an end surface of the closed end of the slot, and wherein when the prying end is in the third configuration, the outer lateral sides of the first and the second prying members abut the end surface of the closed end of the slot.

6. A prying tool with a prying end which has a changeable width, comprising:

a main body; the prying end including a first prying member and a second prying member pivotally engaged with the main body, wherein the first and the second prying members are pivotal toward and away from each other, wherein the prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other, and wherein the prying end increases its width when the first and the second prying members pivot from the first configuration to the third configuration; and a locking mechanism configured to selectively lock and unlock the first and the second prying members, wherein the locking mechanism includes a position restrainer movably disposed on the main body and movable between a lock position and a release position, wherein the position restrainer forms a restraining end selectively engaging with and disengaging from the first and the second prying members for selectively locking and preventing pivotal movement of the first and the second prying members with respect to the main body, and wherein the position restrainer is in the lock position when the prying end is in the first configuration and the third configuration and in the release position when the prying end is in the second configuration;

wherein the main body has a first joining side and a second joining side disposed separately and has a slot delimited therebetween, wherein the slot has an open end and a closed end and extends from the open end to the closed end along a length direction of the main body, and wherein the slot also has two open sides and extends from one open side to another open side along a width direction of the main body; and wherein the first and the second prying members are pivotally engaged with the first and the second joining sides and inserted into the slot, wherein the first prying member has an end forming a pivot end and is pivotal about a first pivot, wherein the second prying member has an end forming a pivot end and is pivotal about a second pivot, and wherein the first and the second pivots each has an end connected to the first joining side and another end connected to the second joining side.

7. The prying tool as claimed in claim 6, wherein the first and the second prying members include a position limiter disposed therebetween, and wherein the position limiter has an end connected to the first joining side and another end connected to the second joining side.

8. The prying tool as claimed in claim 6, wherein the main body has a hole and the position restrainer is movably disposed in the hole.

9. A prying tool with a prying end which has a changeable width, comprising:

a main body; the prying end including a first prying member and a second prying member pivotally engaged with the main body, wherein the first and the second prying members are pivotal toward and away from each other, wherein the prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other, and wherein the prying end increases its width when the first and the second prying members pivot from the first configuration to the third configuration; and a locking mechanism configured to selectively lock and unlock the first and the second prying members, wherein the locking mechanism includes a position restrainer movably disposed on the main body and movable between a lock position and a release position, wherein the position restrainer forms a restraining end selectively engaging with and disengaging from the first and the second prying members for selectively locking and preventing pivotal movement of the first and the second prying members with respect to the main body, and wherein the position restrainer is in the lock position when the prying end is in the first configuration and the third configuration and in the release position when the prying end is in the second configuration;

wherein the main body has a first joining side and a second joining side disposed separately and has a slot delimited therebetween, wherein the slot has an open end and a closed end and extends from the open end to the closed end along a length direction of the main body, and wherein the slot also has two open sides and extends from one open side to another open side along a width direction of the main body; and wherein the main body has a hole and the position restrainer is movably disposed in the hole; and wherein the position restrainer is movably disposed and moves linearly in the hole, wherein the hole extends along the length direction of the main body from the slot, and wherein the hole has an open end opening to the slot and a closed end opposite the open end and extends from the open end to the closed end along the length direction of the main body.

10. The prying tool as claimed in claim 9, wherein the position restrainer is biased by a resilient member, wherein the resilient member has one of two opposite ends abutting the closed end of the hole and another of the two opposite ends abutting the position restrainer.

11. A prying tool with a prying end which has a changeable width, comprising:

a main body; the prying end including a first prying member and a second prying member pivotally engaged with the main body, wherein the first and the second prying members are pivotal toward and away from each other, wherein the prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other, and wherein the prying end increases its width when the first and the second prying members pivot from the first configuration to the third configuration; and a locking mechanism configured to selectively lock and unlock the first and the second prying members, wherein the locking mechanism includes a position restrainer movably disposed on the main body and movable between a lock position and a release position, wherein the position restrainer forms a restraining end selectively engaging with and disengaging from the first and the second prying members for selectively locking and preventing pivotal movement of the first and the second prying members with respect to the main body, and wherein the position restrainer is in the lock position when the prying end is in the first configuration and the third configuration and in the release position when the prying end is in the second configuration;

wherein the main body has a first joining side and a second joining side disposed separately and has a slot delimited therebetween, wherein the slot has an open end and a closed end and extends from the open end to the closed end along a length direction of the main body, and wherein the slot also has two open sides and extends from one open side to another open side along a width direction of the main body; and wherein the main body has a hole and the position restrainer is movably disposed in the hole; and wherein the position restrainer has an end disposed outside the hole and protruding in the slot, and wherein the end of the position restrainer forms the restraining end.

12. A prying tool with a prying end which has a changeable width, comprising:

a main body; the prying end including a first prying member and a second prying member pivotally engaged with the main body, wherein the first and the second prying members are pivotal toward and away from each other, wherein the prying end has a first configuration in which the first and the second prying members are locked and disposed adjacent to each other and include inner lateral sides thereof facing each other, a second configuration in which the first and the second prying members are unlocked and adapted to be moved away from each other, and a third configuration in which the first and the second prying members are locked and disposed away from each other and include the inner lateral sides thereof not facing each other, and wherein the prying end increases its width when the first and the second prying members pivot from the first configuration to the third configuration; and a locking mechanism configured to selectively lock and unlock the first and the second prying members, wherein the locking mechanism includes a position restrainer movably disposed on the main body and movable between a lock position and a release position, wherein the position restrainer forms a restraining end selectively engaging with and disengaging from the first and the second prying members for selectively locking and preventing pivotal movement of the first and the second prying members with respect to the main body, and wherein the position restrainer is in the lock position when the prying end is in the first configuration and the third configuration and in the release position when the prying end is in the second configuration;

wherein the position restrainer is adapted to be operably moved between the lock position and the release position by a controller, and wherein the controller is coupled to the position restrainer; and wherein the position restrainer has an aperture to which an end of the controller is connected, wherein the controller has another end disposed outside a hole of the main body, thereby allowing a user to input to control movement of the position restrainer, and wherein the controller extends in a cavity which extends from the hole of the main body to an outer periphery of the main body.

* * * * *